United States Patent

[11] 3,580,606

| [72] | Inventor | Millard C. Wagner<br>Urbana, Ohio |
|---|---|---|
| [21] | Appl. No. | 825,587 |
| [22] | Filed | May 19, 1969 |
| [45] | Patented | May 25, 1971 |
| [73] | Assignee | Thomas Kappel, Inc.<br>Springfield, Ohio |

[54] CARGO LOADING AND SUPPORT SYSTEM
9 Claims, 16 Drawing Figs.

| [52] | U.S. Cl. | 280/179, 105/376 |
|---|---|---|
| [51] | Int. Cl. | B60p 7/00 |
| [50] | Field of Search | 280/179; 105/376, 368, 369; 214/500 |

[56] References Cited
UNITED STATES PATENTS

| 1,887,325 | 11/1932 | Pratt et al. | 105/368 |
| 1,969,434 | 8/1934 | Snyder | 105/368 |
| 2,827,958 | 3/1958 | Lee | 105/376 |
| 2,989,011 | 6/1961 | Henrikson | 105/376 |

Primary Examiner—Kenneth H. Betts
Assistant Examiner—Robert R. Song
Attorney—Marechal, Biebel, French & Bugg ABSTRACT: A system for loading and supporting several truck cabs in a van for shipment with the cabs stowed in nested but spaced relationship so that a maximum number of cabs may be shipped without damage to the cabs through contact with each other or the interior of the van. Each cab has a pair of bars having wheels at their outer ends attached to it and extending transversely of the van with the wheels engaging tracks running longitudinally of the van, and stops are associated with the tracks to prevent movement of one of the bars and stabilize the load during shipment.

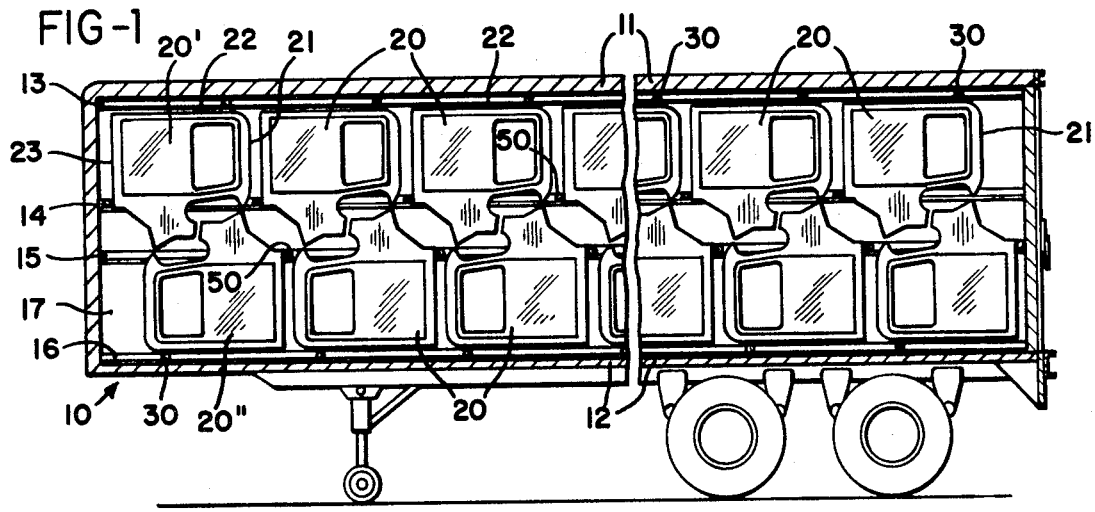

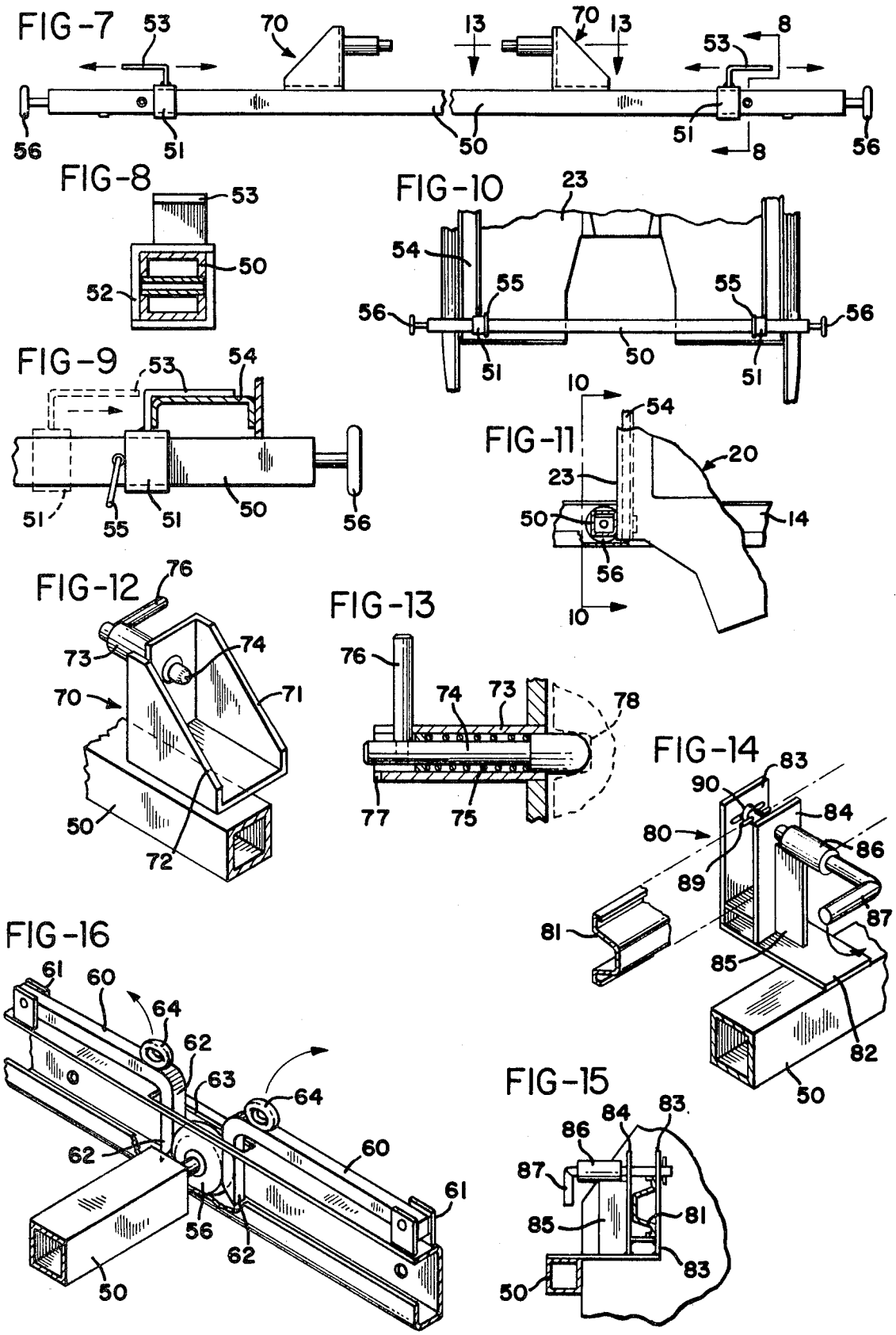

3,580,606

1

CARGO LOADING AND SUPPORT SYSTEM

BACKGROUND OF THE INVENTION

It is often desirable in manufacturing processes to manufacture several components of a unit at different points and ship the components to a central assembling plant for assembly of the complete unit. For example, in the construction of trucks it is often desirable to manufacture such things as the chassis, cabs, differential, transmissions and the like at different points and ship these components to a central assembly plant where they are assembled to form the finished truck. While the shipment of most of these components requires no special precautions, the truck cabs are subject to damage by scratching, denting, or the like or exposure to exhaust fumes and inclement weather. In the past, special racks have been built to maintain the truck cabs in spaced relationship to each other in order to obviate damage thereto. While the open frameworks did serve to prevent scratching and denting of the cabs through contact with each other and the framework itself during shipment, it was recognized as desirable to ship the cabs in a closed van to prevent damage from such things as exhaust fumes and inclement weather. However, under existing government regulations the maximum size of a van is limited to the point where it was thought that the number of cabs which could be shipped in a single van would be uneconomical. Additionally, shipment of truck cabs in a closed van presents special loading problems, since the cabs can be handled from one side only. And of course, as in the case of the open frameworks, the cabs must be maintained relatively immobile to prevent damage by scratching, denting and the like.

SUMMARY OF THE INVENTION

The present invention provides a combined loading and support system for a closed van which permits cabs to be readily loaded and unloaded into and from the van and supports the cabs in nested yet spaced relationship to each other for transport. By nesting the cabs, the number of cabs which can be carried by a single van is increased to the point where a van of a size within the regulated limits provides sufficient volume to ship a sufficient number of cabs to provide an economical operation. At the same time, the support and loading system of the present invention rigidly maintains the cabs in spaced relationship to each other and to the interior surfaces of the van so that damage to the cab does not occur through inadvertent contact. Additionally, since the mounting structure for the cabs serves the dual function of a loading system, the problems associated with loading an enclosed van are eliminated.

BRIEF DESCRIPTION OF THE DRAWINGS

FIG. 1 is an elevational view of a loaded van with one wall of the van removed to show the nested relationship of the cabs carried by the loading-support system of the van;

FIG. 2 is a view of a mounting bar with the wheels at the end thereof engaging tracks mounted on the inner walls of the van;

FIG. 3 is a view taken on line 3-3 of FIG. 2 with parts removed for clarity;

FIG. 4 is a view of one end of a bar showing the wheel at one end thereof mounted to accommodate vans of varying widths;

FIG. 5 is a rear view of a portion of a truck cab showing the mounting bar attached to the rear window of the cab;

FIG. 6 is a view taken on line 6-6 of FIG. 5;

FIG. 7 is a view of a stabilizing bar having cab engaging means for two different types of cabs mounted thereon;

FIG. 8 is a view taken on line 8-8 of FIG. 7;

FIG. 9 is a view of a portion of a stabilizing bar showing one form of a cab engaging means engaging a portion of a cab;

FIG. 10 is a view of stabilizing bar attached to a truck cab;

FIG. 11 is a view through a stabilizing bar attached to a truck cab and showing one end of the bar engaging a track member mounted on the interior of a van;

FIG. 12 is a perspective view of another form of cab engaging means mounted on a stabilizing bar;

FIG. 13 is a view taken on line 13-13 of FIG. 7;

2

FIG. 14 is a perspective view of a portion of a stabilizing bar showing a third form of a cab engaging means;

FIG. 15 is another view of the cab engaging means of FIG. 14; and

FIG. 16 is a perspective view of the stop members engaging the wheel of a stabilizing bar.

DESCRIPTION OF THE PREFERRED EMBODIMENTS

As seen in FIG. 1 of the drawings, a van 10 having a roof 11 and a floor 12 is loaded with a plurality of truck cabs 20. Each truck cab has a roof 21, a backwall 22, and a bottom portion 23 with as seen in FIG. 5, a window 24 having upper and lower portions 25 and 26 formed in the backwall of the cab.

With continued reference to FIG. 1 of the drawings, it will be seen that a plurality of tracks 13, 14, 15 and 16 are mounted on the interior of each sidewall 17 of the van 10 and extend longitudinally of the van in parallel spaced relationship to each other. Although only one wall of the van and one of each of the four pairs of track members are shown in FIG. 1 it is to be noted that like track members are mounted in opposition to those shown in FIG. 1 on the opposite wall of the van so that in fact, there are four pairs of track members: an upper pair extending adjacent the roof 11 of the van, a lower pair extending adjacent the floor 12 of the van and first and second intermediate pairs of tracks, one track 14 and 15, of each pair respectively being shown in FIG. 1.

As best seen in FIGS. 2 and 3, a plurality of mounting bars 30 are provided which engage the rear window frame of a cab and support the cab from a pair of tracks in the van. Each mounting bar 30 comprises an elongated tubular member 31 having wheels 32 mounted on each end thereof. An angle bar 33 is mounted with one leg 34 overlying the member 31 and extending perpendicularly therefrom and the other leg 35 of the angle member extending perpendicularly from the outer end of the leg 34 in spaced overlying relationship to the tubular member 31 to form a substantially U-shaped opening 36. Also attached to the tubular member 31 is an upright stanchion 40 having an outer portion 41 and an inner portion 42 telescoped therein. A spring member 43 is mounted in the portion 41 of the stanchion and bears against the leg 34 at one end and the inner end of the inner member 42 at its opposite end; thereby urging the member 42 outwardly of the member 41. A pin 44 engages the inner member 42 adjacent one end thereof and rides in a slot 45 formed in the outer member 41. In this way, not only is outward movement of the member 42 with respect to the member 41 limited, but the member 42 is prevented from turning with respect to the number 41. Mounted at the outer end of the member 42 is substantially U-shaped member 46 opening outwardly away from the U-shaped opening 36 formed at the opposite end of the stanchion 40. The interiors of member 46 and the U-shaped opening 36, as well as portions of the tubular member 31, may be lined with a resilient material 47 to prevent damage to a cab when the mounting bar is attached thereto. As probably best seen in FIGS. 5 and 6, the mounting bar 40 is attached to a truck cab by slipping the U-shaped members 46 over the bottom portion 26 of the window frame of a cab. The member 31 is then pushed downwardly, compressing the springs 43, and then forwardly to engage the upper portion 25 of the cab window frame in the U-shaped openings 36. The spring tension of the spring 43 tends to hold the bar in engagement with the window frame of the cab and a pin 48 may be provided passing through the inner portion 42 of the stanchion to lock the mounting bar in place.

With the mounting bar 30 attached to the cab the cab is tipped backwardly with its backwall 22 substantially horizontal and its bottom portion 23 substantially vertical so that the cab assumes the position of the cabs in the lower tier of the van shown in FIG. 1. A cab in this position is then ready to receive a stabilizing bar 50 which is attached to the lower portion of the cab adjacent the forward edge thereof as seen in FIG. 10. The stabilizing bars are provided with means for engaging a portion of a cab adjacent the forward edge of the bottom portion thereof and this engaging means will take a variety of forms depending upon the specific structural configuration of the cab being loaded.

The bar 50 shown in FIG. 7 is designed to accommodate two different types of cabs. Thus, adjacent its outer ends the bar 50 is provided with brackets 51 which include a collar portion 52 and an upstanding L-shaped portion 53. The brackets 51 are slidable along the bars 50 and are adapted to engage a structural portion 54 of a cab as shown in FIGS. 9 and 10. When the brackets 51 are in their outermost position and engaging a portion of a truck cab as seen in FIGS. 9 and 10, a pin 55 may be inserted through the bar 50 to lock the bracket 51 in this position.

With a mounting bar 30 and a stabilizing bar 50 attached to a truck cab the cab is then turned to the position shown in the upper tier of cabs in FIG. 1 and the wheels 56 at each end of the stabilizing bar 50 are engaged in the upper intermediate tracks 14 extending longitudinally along each wall of the van 10. The truck cab is then advanced into the van until the wheel 32 on each end of the mounting bar 30 engage the upper tracks 13 extending along each side of the van adjacent the roof 11 thereof. The truck cab 20 is then rolled into position adjacent the forward wall of the van substantially in the position shown for the truck cab 20'. A second truck cab is then also provided with a mounting bar and a stabilizing bar, in the manner described above for the truck cab 20', and the cab is positioned with respect to the van in the same manner as the cabs shown in the lower tier in FIG. 1. The cab is then advanced into the van until the wheels 32 on the mounting bar 30 engage the lower track member 16 adjacent the floor 12 of the van. Forward movement of the cab is continued until the wheels 56 at the outer ends of the bar 50 engage the lower intermediate track 15 and the cab is then advanced until it occupies the position shown for the cab 20'' in FIG. 1 of the drawings, with the cabs 20' and 20'' in nesting relationship and the roof of the cab 20' positioned adjacent the lower portion of the cab 20''. Additional cabs are then provided with mounting and stabilizing bars in a manner described above and loaded with an upper and lower cab alternating to provide the nested relationship shown in FIG. 1. AS each cab is rolled into its position, stop members 60, FIG. 16, are swung into position to engage the wheels 56 of the stabilizing bars and prevent further movement of the cab until it is desired to unload the van. As seen in FIG. 16, the stop members comprise pairs of L-shaped members each pivotally mounted as at 61 on the first and second intermediate track members. The stop members 60 are positioned along the track members 14 and 15 so that when they are positioned with legs 62 thereof passing through the slot 63 formed in the rails 14 and 15 of legs 62 engage opposite sides of a wheel 56 and prevent movement of the bar 50. It will be noted that it is only necessary to lock one of the bars attached to each cab, either the mounting bar or the stabilizing bar, to prevent movement of the cab in the van and while the stop members are shown as mounted on the upper and lower intermediate tracks 14 and 15 they could as easily be mounted on the tracks 13 and 16 and accomplish the same results. A loop 64 is attached to each of the stop members 60 as seen in FIG. 16. When it is desired to unload a van it will usually be found that the spacing between the sidewalls of the cab and the sidewalls of the van is rather limited and it will be difficult to manually reach in and pivot the stop members 60 into their inoperative position. By means of a loop 64, however, a long rod with a hook on the end can be used to engage the stop members 60 and pivot them into an operative position so that the truck cabs 20 may be rolled out of the van.

While as noted above, the general configuration of the cabs 20 are the same and each will usually be provided with a rear window 24 for attaching a mounting bar 30 thereto, the exact positioning of the structural members of the cab may be somewhat different, requiring different types of stabilizing bars engaging means for different types of cabs. One type of engaging means comprising the bracket 51 has been described above. A second type of engaging means may be of the type shown as 70 in FIGS. 7, 12 and 13. As best seen in FIGS. 7 and 12, the engaging means 70 may comprise upstanding plate members 71 and 72 with a tubular member 73 mounted in a continuation of the plate member 71. A spring loaded pin member 74 is mounted in the tubular member 73 with a spring 75 bearing against an enlargement of the spring member 74 at one end and a portion of the tubular member 73 at its opposite end; thereby urging the pin member 73 outwardly through the continuation of the plate member 71. A handle 76 is attached to one end of the pin member 74 and twisting the handle 76 about the axis of pin 74 causes the handle to ride in the camming slot 77 and retract the pin 74. The particular type of cab which the engaging means 70 is adapted to be used with has a recess 78 formed in a portion thereof adjacent the forward edge of its lower portion 23. Thus, with the pin 74 extending into the recesses 78, as seen in FIG. 13, the stabilizing bar 50 is again attached to the truck cab adjacent the lower forward portion thereof.

A still further embodiment of the cab engaging means is shown in FIGS. 14 and 15. This type of engaging means 80 is positioned adjacent the central portion of a stabilizing bar 50 and is adapted to engage a structural member 81 extending across the lower forward portion of the truck cab. As seen in FIGS. 14 and 15, the engaging means 80 may comprise a flat plate member 82 attached to the stabilizing bar 50 and carrying a pair of upstanding plate members 83 and 84 adjacent one end of the plate member 82. A third upstanding plate member 85 is attached to the plate members 84 and 82 as by welding or the like and a collar 86 is mounted adjacent one end thereof, also by welding. An L-shaped pin member 87 is received within the bore of the collar 86 and an aperture 88 formed in the plate 84. Adjacent its outer end the pin member 87 has a second, smaller pin member 89 which extends perpendicularly therethrough. It will be obvious from an inspection of FIGS. 14 and 15 that the pin 87 may be retracted to allow the upstanding plate member 83 and 84 to be positioned on either side of the structural member 81 and then the pin member 87 advanced with the pin 89 aligned with the corresponding portions of a slot 90 formed in the plate 83. The pin member 88 is then twisted so that the pin 89 engages portions of the plate 83, locking the engaging means about the structural member 81.

With each of the embodiments of the cab engaging means shown in FIGS. 9, 12 and 14, for example, and described above, the stabilizing bar is attached to the truck cab at approximately the same position and the various parts of each of the engaging means are so proportioned that when the various cabs are loaded in the van the wheel 56 of the stabilizing bar are correctly positioned with respect to the stop members 60.

It should also be noted that on both the stabilizing and mounting bars the wheels on at least one end of the bars are attached thereto to accommodate limited variations in the distance between the sidewalls of the van. Thus, as seen in FIG. 4, a mounting bar 30 may have a pair of bearing blocks 100 positioned adjacent its end and slightly inwardly thereof and apertured to receive the axle 101 of a wheel 32 engaging either the upper or lower tracks 13 or 16. A slot 102 is formed in a wall of a mounting bar 30 and a pin 103 having a head 104 passes through the slot and engages the axle 101. In this way, limited movement of the axle and wheel axially of its associated bar is permitted and variations in the distance between the sidewalls of the van, and hence, the distance between the tracks mounted on the sidewalls, may be accommodated within limits. While this feature has been described in connection with the mounting bar 30 it will be obvious that all of the bars, whether stabilizing bars 50 or mounting bars 30, are provided with this feature.

From the above, it will be apparent that the present invention provides means for loading, unloading and supporting several truck cabs within a closed van where they are protected from exhaust fumes, inclement weather and the like, and the maximum advantage of the volume of the van is utilized by positioning the cabs in nested relationship with respect to each other. At the same time the cabs are relatively fixed, thereby preventing damage through contact with each other and the interior of the van while the cabs are in transient.

While the forms of apparatus herein described constitute preferred embodiments of the invention, it is to be understood that the invention is not limited to these precise forms of apparatus, and that changes may be made therein without departing from the scope of the invention.

What I claim is:

1. A cargo storage system comprising:
   a. a support structure,
   b. a first pair of track members mounted on said support structure and extending longitudinally thereof in spaced parallel relationship to each other,
   c. a mounting bar adapted to extend transversely of said support structure with end portions of said mounting bar engaging said first track members for movement longitudinally of said support structure,
   d. means carried by said mounting bar for engaging an article of cargo,
   e. a second pair of track members mounted on said support structure and extending longitudinally thereof in spaced, parallel relationship to said first pair of track members and to each other,
   f. a stabilizing bar adapted to extend transversely of said support structure with end portions of said stabilizing bar engaging said second pair of track members for movement longitudinally of said support structure, and
   g. means carried by said stabilizing bar for engaging an article of cargo at a point on said article spaced from the point of engagement therewith by said mounting bar engaging means.

2. The apparatus of claim 1 further comprising:
   a. stop member carried by one of said pairs of track members for inhibiting movement of the bar associated therewith longitudinally of said support structure.

3. The apparatus of claim 2 wherein:
   a. said stop members are carried by said second pair of track members for inhibiting said movement of said stabilizing bar longitudinally of said support structure.

4. The apparatus of claim 3 wherein said means carried by said mounting bar for engaging an article of cargo comprises:
   a. an angle member attached adjacent each end of said mounting bar and forming with one surface thereof a substantially U-shaped member, and
   b. a telescopic stanchion carrying a second U-shaped member at its outer end and attached to said mounting bar adjacent the point of attachment thereto of said angle member; whereby said first and second U-shaped members are adapted to engage upper and lower portions of a window frame of a cab.

5. The apparatus of claim 4 wherein said cargo engaging means comprises:
   a. bracket members mounted adjacent each end of said stabilizing bars for movement longitudinally thereof, and
   b. pin members extending through said stabilizing bars for limiting movement of said bracket members therealong.

6. The apparatus of claim 4 wherein said cargo engaging means comprises:
   a. spring loaded pin members mounted adjacent each end of each of said stabilizing bars in opposition to each other and in spaced parallel relationship to said stabilizing bars.

7. The apparatus of claim 4 wherein said cargo engaging means comprises:
   a. pairs of upstanding plate members mounted intermediate the ends of each of said stabilizing bars and having apertures formed adjacent the distal portions thereof, and
   b. pin members slidably received in said aperture and extending transversely of said stabilizing bars.

8. A loaded cargo van comprising:
   a. upper and lower pairs of track members attached to said van adjacent the roof and floor thereof, extending longitudinally thereof and in parallel spaced relationship to each other,
   b. a plurality of cabs each having a roof, a backwall and a bottom portion,
   c. a first mounting bar extending transversely of said van and having end portions engaging said upper pair of track members,
   d. means carried by said first mounting bar for engaging a first cab and mounting said cab with the backwall thereof positioned adjacent said roof of said van,
   e. a second mounting bar extending transversely of said van and having end portions engaging said lower pair of track members,
   f. means carried by said second mounting bar for engaging a second cab and mounting said second cab with the backwall thereof positioned adjacent said floor of said van,
   g. the roof of said first cab being positioned adjacent the bottom portion of said second cab and the roof of said second cab being positioned adjacent the bottom portion of said first cab; whereby said cabs are mounted in said van in a nested arrangement but spaced relationships, and
   h. means cooperating with said mounting bars for stabilizing each of said cabs in said van.

9. A cargo storage system comprising:
   a. an elongated, enclosed van forming a support structure,
   b. four pairs of track members extending longitudinally of said van in spaced parallel relationship to each other and constituting upper, lower and first and second intermediate pairs of tracks,
   c. mounting bars extending transversely of said support structure with rollers mounted on each end of said mounting bars and engaging said upper and lower tracks for movement of said mounting bars longitudinally of said support structure,
   d. rollers on at least one end of said mounting bars being mounted for limited movement on said mounting bars longitudinally of their axes of rotation,
   e. an angle member attached to said mounting bar adjacent each end thereof with one leg of each of said angle members overlying said mounting bar and extending perpendicularly therefrom and the other leg of said angle member extending perpendicularly from the outer end of said one leg in spaced overlying relationship to a portion of said mounting bar to form therewith a first U-shaped member,
   f. a spring loaded, telescopic stanchion attached to said mounting bar adjacent the point of attachment of said angle member thereto and extending from said mounting bar in a direction opposite to the direction of extension of said other leg of said angle member,
   g. a second U-shaped member having the base thereof mounted on the distal portion of said stanchion with the legs of said second U-shaped portion extending in a direction away from the direction of extension of said other leg of said angle member,
   h. a pin member extending through said stanchion for limiting telescopic movement thereof,
   i. stabilizing bars extending transversely of said support structure with rollers mounted on each end of each of said stabilizing bars and engaging said first and second intermediate pairs of tracks,
   j. rollers on at least one end of said stabilizing bars being mounted for limited movement on said stabilizing bars longitudinally of their axes of rotation,
   k. means carried by said stabilizing bars for engaging an article of cargo mounted on said mounting bars and supported thereby, and
   l. pairs of L-shaped members, each pivotally mounted at the outer end of one leg thereof on said first and second intermediate track members,
   m. the other leg of each of said L-shaped members being adapted to be pivoted from an inoperative position to an operative position in which they block movement along said first and second intermediate tracks with said other legs of each pair of L-shaped members being spaced from each other in their operative positions slightly more than the diameter of said stabilizing bar rollers.